(12) United States Patent
Sinton et al.

(10) Patent No.: US 7,309,850 B2
(45) Date of Patent: Dec. 18, 2007

(54) MEASUREMENT OF CURRENT-VOLTAGE CHARACTERISTIC CURVES OF SOLAR CELLS AND SOLAR MODULES

(75) Inventors: Ronald A. Sinton, Boulder, CO (US); Robert G. Pauley, Louisville, CO (US)

(73) Assignee: Sinton Consulting, Inc., Boulder, CO (US)

( * ) Notice: Subject to any disclaimer, the term of this patent is extended or adjusted under 35 U.S.C. 154(b) by 0 days.

(21) Appl. No.: 11/198,690

(22) Filed: Aug. 5, 2005

(65) Prior Publication Data

US 2007/0029468 A1 Feb. 8, 2007

(51) Int. Cl.
*G01C 21/02* (2006.01)
*G01J 1/44* (2006.01)
*G01R 31/26* (2006.01)

(52) U.S. Cl. .................... 250/203.4; 250/214 R; 324/765

(58) Field of Classification Search ........... 250/214 R, 250/203.4, 214.1; 324/765, 767
See application file for complete search history.

(56) References Cited

U.S. PATENT DOCUMENTS

| | | | | |
|---|---|---|---|---|
| 2,690,537 A | * | 9/1954 | Weiss et al. ............... | 324/357 |
| 4,129,823 A | * | 12/1978 | van der Pool et al. ...... | 324/767 |
| 4,163,194 A | * | 7/1979 | Ross ........................... | 324/767 |
| 4,184,111 A | | 1/1980 | Lovelace et al. ........... | 324/404 |
| 4,614,879 A | * | 9/1986 | Ault ............................ | 307/130 |
| 5,164,019 A | | 11/1992 | Sinton ........................ | 136/249 |
| 5,682,305 A | * | 10/1997 | Kurokami et al. ......... | 363/79 |
| 5,945,839 A | * | 8/1999 | Hyvarinen ................. | 324/765 |
| 6,111,391 A | * | 8/2000 | Cullen ........................ | 323/223 |

(Continued)

FOREIGN PATENT DOCUMENTS

EP    1 179 875 A2    2/2002

(Continued)

OTHER PUBLICATIONS

Ronald A. Sinton and Andres Cuevas; "A New Methodology for Determining Recombination Parameters Using and RF Photoconductance Instrument"; Australian National University, Canberra, Australia.

(Continued)

*Primary Examiner*—Que Tan Le
*Assistant Examiner*—Pascal M Bui-Pho
(74) *Attorney, Agent, or Firm*—Beyer Weaver LLP

(57) ABSTRACT

A solar cell or solar module is measured during a short pulse of light in such a way that the resulting data for current and voltage at each light intensity is the same as would be measured under steady-state illumination conditions and therefore predictive of the actual performance of the solar cell or solar module in sunlight. A varying voltage is applied to the terminals of the solar cell during a light pulse so that the instantaneous current at a given voltage and light intensity during the light pulse is the same as would be measured under constant illumination at that same given intensity. A constant voltage is modified by a small signal correction that is proportional to the terminal current. Or, the small signal correction is proportional to the light intensity. An analog feedback circuit is constructed using the terminal current or light intensity for feedback in order to provide the requisite varying voltage. The varying voltage may also be supplied by digital synthesis.

46 Claims, 11 Drawing Sheets

U.S. PATENT DOCUMENTS

| | | | |
|---|---|---|---|
| 6,946,858 B2* | 9/2005 | Matsuyama | 324/752 |
| 6,984,970 B2* | 1/2006 | Capel | 323/299 |
| 7,148,650 B1* | 12/2006 | McNulty et al. | 318/801 |
| 2002/0163323 A1* | 11/2002 | Kasai et al. | 323/284 |
| 2004/0021445 A1* | 2/2004 | Harris | 320/136 |
| 2005/0002214 A1* | 1/2005 | Deng et al. | 363/131 |
| 2005/0017697 A1* | 1/2005 | Capel | 323/266 |
| 2005/0073289 A1* | 4/2005 | Takada et al. | 323/282 |

FOREIGN PATENT DOCUMENTS

| | | |
|---|---|---|
| JP | 57-7571 | 1/1982 |
| JP | 57007571 | 1/1982 |
| JP | 2003-28916 | 1/2003 |
| JP | 2003028916 | 1/2003 |

OTHER PUBLICATIONS

R.A. Sinton and A. Cuevas; "A Quasi-Steady-State Open-Circuit Voltage Method for Solar Cell Characterization"; 16$^{th}$ European Photovoltaic Solar Energy Conference, Glasgow, Scotland, May 1-5, 2000.

H.A. Ossenbrink, W. Zaaiman, J. Bishop; "Do Multi-Flash Solar Simulators Measure the Wrong Fill Factor?"; 1194-1196, 1993 IEEE.

William M. Keogh, Andrew W. Blakers, Andres Cuevas; "Constant Voltage I-V Curve Flash Tester for Solar Cells."; Solar Energy Materials & Solar Cells 81 (2004) 183-196.

Donald A. Clugston and Paul A. Basore; "PC1D Version 5: 32-Bit Solar Cell Modeling on Personal Computers"; 1997 IEEE, pp. 207-210.

Ronald A. Sinton, Denis De Ceuster, Karen Wilson, Laetitia Rodriques Barbosa; "Flash Testing High-Efficiency Silicon Solar Cells and Modules"; 20$^{th}$ EPSEC Jun. 2005 Barcelona, Spain.

R.A. Sinton and R.M. Swanson; "Design Criteria for Si Point-Contact Concentrator Solar Cells"; IEEE Transactions on Electron Devices Vol. ED-34, No. 10, Oct. 1987.

Ronald A. Sinton and Richard M. Swanson; "Recombination in Highly Injected Silicon"; IEEE 1987, pp. 1380-1389.

Ronald A. Sinton and Andres Cuevas; Contactless Determination of Current-Voltage Characteristics and Minority-Carrier Lifetimes in Semiconductors from Quasi-Steady-State Photoconductance Data; Appl. Phys. Lett. 69 (17), Oct. 21, 1996; pp. 2510-2512.

J.J Wiczer, R.J. Chaffin and R.E. Hibray; "Some Advanced Testing Techniques for Concentrator Photovoltaic Cells and Lenses"; 1982 IEEE pp. 448-453.

P.G. Borden, R.A. LaRue, P.E. Gregory and R. Boettcher; "The Flash Testing of AlGaAs/GaAs Concentrator Solar Cells"; 1981 IEEE, pp. 193-196.

PCT/US2006/025626; International Search Report; Apr. 6, 2007.

* cited by examiner

Terminal Voltage vs. Time Profile

Instantaneous and Steady-state Current vs. Time

Current Density vs. Light Intensity

Current Density vs. Light Intensity

Analog Feedback System

Analog Feedback System

Digital Feed Forward System

Current-Voltage Curve and Cell Efficiency

MEASUREMENT OF CURRENT-VOLTAGE CHARACTERISTIC CURVES OF SOLAR CELLS AND SOLAR MODULES

FIELD OF THE INVENTION

The present invention relates generally to measurement of solar cells and solar modules, i.e., photovoltaic cells and modules. More specifically, the present invention relates to a method for the measurement of current-voltage characteristic curves of solar cells and solar modules during research and development or production.

BACKGROUND OF THE INVENTION

In the production of solar cells and solar modules, measurement and rating of the resulting cells and modules at the various stages of production is required for quality control, the proper matching of cells to go into modules, and the rating of the modules at the end of production. Measurement of the solar cells or modules is often done using short pulses of light (Van der Pool, Borden, Wiczer, King, Hyvärinen, Keogh).

Typical pulses can be from Xenon lamps discharging a capacitor, as in a typical photographic flashlamp (Borden, Sinton 1996, Hyvärinen, Sinton 2000), Xenon lamps with a pulse-forming network (Wiczer), flashlamps with control electronics to control the intensity-time profile, or LED flashes. Voltage, current and intensity data can be taken for the entire light pulse (Wiczer, Sinton 1996, Sinton 2000) or for just a point or portion of the light pulse (Borden, Hyvärinen).

Frequently, the acquisition of the current-voltage data for cell or module testing is accomplished by ramping the voltage from short-circuit conditions to open-circuit conditions (or from open-circuit to short-circuit conditions) during a single light pulse while the intensity is close to the intensity of interest in order to obtain the entire current-voltage curve (Wiczer, King, Hyvärinen). This has been shown to result in significant errors in the measurement of some solar cells and modules due to the delayed time response of the solar cell to the voltage ramp (King). This error means that the measured results will not necessarily predict the performance of the solar cell or module under constant illumination, voltage and current conditions, i.e., steady-state conditions.

For example, King indicates that a 20 V/second voltage ramp rate would result in a 1% error in the measured power output of some high-efficiency cells. The method of Hyvärinen, using the example of a linear ramp rate from short circuit to open circuit in 400 µs, results in a ramp rate of about 1700 V/s (per cell in series in a module). This ramp rate is about 85 times too fast for a measurement of the cells described in King to achieve a 1% accuracy relative to the steady state. Some modern commercial cells require ramp rates of less than 5 V/s (per cell in series) in order to have less than 1% of error due to the transient response time of the cell to changing voltage. For a linear voltage ramp from short-circuit to open-circuit voltage as in Wiczer, King and Hyvärinen, this measurement could take 130 ms and is not practical for short light pulses.

Maintaining a constant current during a pulse with varying illumination intensity results in a high rate of voltage ramping and can also result in inaccurate measurements for high-efficiency silicon solar cells (Borden, Ossenbrink). Under constant current conditions, very high voltage ramp rates result as the voltage responds to the changing light intensity during the pulse.

A common solution to these problems is to hold the voltage constant during a light pulse, and to only measure one current-voltage point at each intensity during the pulse (Keogh, Sinton 2005). By holding the voltage constant during the light pulse, the time response of the solar cell or solar module is much better, yielding a more accurate result (Keogh). Using this method, a full curve of current-voltage points at a given intensity is constructed by taking multiple flashes and extracting the relevant data.

This constant voltage method has been shown, however, to have significant error in the case of newer generations of high-efficiency solar cells in cases when the light intensity is not constant during the measurement. Even this best case of maintaining a constant voltage during the light pulse has been shown to have significant transient errors that result in the current-voltage-intensity data being significantly different than the steady-state results that would be obtained under conditions of constant current, voltage, and light. This discrepancy has been shown to be due to changes in the stored charge in the solar cells that can occur even when the terminal voltage at the solar cells or modules is held constant (Sinton 2005). These errors can make this data a very inaccurate predictor of the characteristics of the solar cell or module under constant light conditions such as sunlight. This makes the data from flash testing very unreliable for predicting cell or module performance for these types of solar cells and modules.

These inaccuracies are largest for high-voltage solar cells. As successive generations of solar cells continue to improve, a larger and larger fraction of all solar cells produced will be subject to these measurement errors when measured under pulsed light. Since the majority of solar modules produced today are measured using flashlamp solar simulators, these errors in measurement are becoming a serious issue that requires a good solution.

FIG. 1 illustrates a graph 10 showing the computer-modeled prior art current response of a commercial solar cell to a pulse of light. Graph 10 is a PC1D (Clugston) numerical simulation of the time response of a commercial high-efficiency solar cell. This simulation is with the terminals of the solar cell held at a constant voltage corresponding to the maximum power point of the solar cell (580 mV in this case) at 0.1 W/cm$^2$ of incident power. The instantaneous measured current 20 is delayed, shifted to the right compared to the light intensity 30. The steady-state current 40 that would be measured at each light intensity for a constant light source is shown for comparison. The instantaneous current is lower than the steady state current during the light intensity rise time, and higher than the steady state current during the fall time. Neither is the correct steady-state result for that intensity. There is only one fleeting moment where the curves cross and the instantaneous current accurately predicts the steady-state current.

Even as the incident light drops to zero, current still flows at the constant voltage giving the module an apparently infinite power conversion efficiency after the light has been extinguished. Clearly, this is not predictive of the steady-state power production of a solar cell with no illumination.

Due to the above inaccuracies in the measurement of solar cells and modules, an improved measurement technique is desirable.

SUMMARY OF THE INVENTION

To achieve the foregoing, and in accordance with the purpose of the present invention, a technique is disclosed that overcomes the problem of transient errors due to measurement during a short pulse of light. The present invention enables the use of short pulses of light to accurately measure the characteristics of solar cells and modules in order to accurately predict their performance under steady-state illumination conditions.

Rather than holding the voltage at the terminals of the solar cell or solar module constant during the pulse, the voltage at the solar cell or solar module terminals is varied by a small signal that is proportional to the current flowing at the terminals. The resulting data for instantaneous current and voltage at a given intensity during the light pulse is as close as possible to the value that would be measured at the same constant current and constant voltage under constant illumination.

In one specific embodiment, the voltage is varied according to the equation (Equation 1):

$$Voltage = K1 - K2 * Current,$$

where Voltage is the terminal voltage, K1 and K2 are constants, and Current is the terminal current.

In a second specific embodiment, the voltage is varied according to the equation (Equation 2):

$$Voltage = K1 - K2 * Light\ Intensity,$$

where Voltage is the terminal voltage, K1 and K2 are constants, and Light Intensity is the illumination incident upon the solar cell or module.

In a third specific embodiment, the voltage is varied according to the equation:

$$Voltage = K1 - K2 * Function(Light\ Intensity),$$

where Voltage is the terminal voltage, K1 and K2 are constants, and Light Intensity is the illumination incident upon the solar cell or module. Function is the function that will give the expected current for each particular light intensity based on a typical relationship between current, intensity and voltage for a solar cell or solar module of the type that is being measured.

The voltage may be controlled using analog feedback, digital synthesis or other suitable technique. By applying this variable voltage to the solar cell or module terminals during a light pulse the measured current is now the same on the rising and falling sides of the light pulse at each light intensity. This current is also the same as the current that would be measured under steady state conditions. The small signal term, K2*terminal current, in Equation 1 (for example) is designed to maintain constant stored charge within the solar cell or solar module. It counteracts changes in the electron- and hole-density profiles in the solar cells, as well as voltage drops due to wiring, solar cell metallization and internal series resistance. This results in faster time response of the solar cell to changing light conditions.

The present invention is applicable to measurement of a wide variety of solar cells and solar modules. The present invention works well with silicon solar cells in general, and more specifically with high-efficiency high-voltage solar cells having an internal capacitance that is orders of magnitude higher than typical industrial silicon solar cells previously manufactured. In particular, high-efficiency silicon solar cells manufactured by BP, Sanyo and SunPower are well suited for the present invention. Further, the present invention is useful with a wide variety of solar cell simulators including discrete flash simulators and multi-flash simulators.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
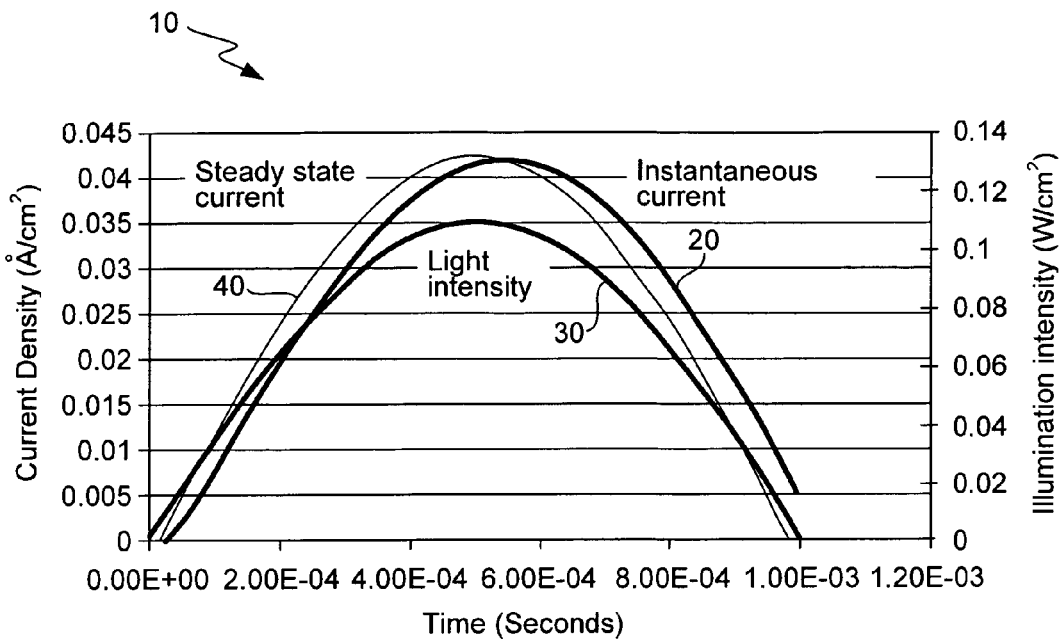
FIG. 1 is a graph showing the computer-modeled prior art current response of a commercial solar cell to a pulse of light.

The measurement of solar cells and modules using pulsed light has many advantages over the use of continuous light. But, because the time response of solar cells and modules can be quite slow, these measurements often have errors in the measured current and voltage compared to the measurement of the same cells or modules under constant-light conditions at the same illumination intensity.

In the measurement of solar cells and modules, the details of the module origin are often unknown. Experts in measuring modules generally treat these modules as black boxes, with terminal characteristics that must be measured correctly and repeatably. For example, in the studies by King the ramp rate was varied to be slower and slower until the result no longer depended upon the ramp rate. This technique determined appropriate measurement conditions that approximate the steady state. This results in an operating mode that requires a very long pulse with a uniform intensity in conjunction with a very slow ramp rate in order to obtain measurements that would predict the steady-state performance of the solar cell or module.

Unfortunately, simple variation of these common methods of solar cell measurement (utilizing constant current, constant resistance, constant voltage, or ramped voltage during a nominally constant portion of the light pulse), does not lead to a solution to the problem at hand. And although the time-response problem discussed above was noted as early as 1981 in Borden, to date there has been no solution for the general case of a light pulse with intensity varying with time during the measurement.

To address the problem at hand, the present inventor performed detailed studies on solar cell behavior, such as the minority-carrier density profile within the solar cell, following the method of Sinton 1987a, as well as detailed studies of the time-dependent profiles of these carrier densities Sinton 1987b. These studies indicate that increasing and decreasing the stored charge in the solar cell is the limiting factor in the time response of the solar cell based on the physics of the solar cell operation. Further, it is realized that the stored charge has terms related to the junction voltage, the current density, and the cell design (particularly the distance from the point of photogeneration of the electron-hole pairs to the collecting junction). For example, a PC1D simulation of the charge (holes) in a high-efficiency n-type backside-contact solar cell reveals that the charge has two parts, a uniform carrier density component dictated by the junction voltage at the back of the cell, and a "transit" component that depends on the carrier-density gradients that drive the current. Both of these terms in the stored charge have a component that depends upon the current density.

It is thus further realized that the factors to be controlled are: (1) terminal voltage, as previously recognized, (2) junction voltage variation due to series resistance between the terminals and the solar-cell junction; and (3) transit capacitance due to the cell design and the distance of the collecting junction from the photogeneration (this transit capacitance is the build up of electron-hole pairs that occurs before a current can flow or change magnitude). Therefore, as the second and third factors are dependent upon the current, it is realized that in the region of the current-voltage curve near the maximum power point, a correction is possible using a small signal variation of the voltage that is proportional to the current. The below technique is thus not a simple variation of the above-listed common methods of solar cell measurement; the proposed technique provides a voltage-time profile that best maintains a constant charge and charge-density profile within the solar cell wafer thickness during the pulse.

VOLTAGE PROPORTIONAL TO CURRENT OR LIGHT INTENSITY

It is realized that applying a varying voltage to the terminals of the solar cell during a light pulse will result in a more accurate current measurement. In particular, if a constant voltage is modified by a small signal correction that is proportional to the terminal current then the measured current will be very nearly the same as the current that would be measured under steady-state conditions. In one specific embodiment, the voltage is varied according to the equation (Equation 1):

$$\text{Voltage} = K1 - K2 * \text{Current},$$

where Voltage is the terminal voltage, K1 and K2 are constants, and Current is the terminal current. The constant K2 is chosen so that the current is the same on the rising and falling sides of the curve. Similarly, this constant can be chosen so that light pulses of differing shapes give the same measured current-voltage points at a given intensity, making the measurement independent of pulse shape. Preferably, the small signal term in Equation 1 (for example), K2*Current, is about 5% to 15% of the constant voltage term K1 when K1−K2*current is the maximum power point of the solar cell or module. This small signal correction is sufficient to compensate for wiring and internal series resistance and other effects in order to maintain constant stored charge in the solar cell. The invention works well when the small signal term is about 10% of the constant voltage term when the voltage is at the maximum power point for the solar cell or solar module. If a constant K2 is chosen that is too large, then the instantaneous current is again different for the leading and trailing sides of the illumination pulse at any given intensity. Hence, there is a unique K2 and the resulting data indicates when it is correct. Choice of the best value for K2 is dependent upon the type of the solar cell or solar module. A good rule of thumb is that the lower bound for K2 is the series resistance of the cell (or module) under test, $R_s$.

The present invention is suitable for use with a wide variety of simulators. The invention is especially relevant to "multiflash" simulators that use a pulse train of relatively short light pulses (similar to the light pulse shown in FIG. 1) to characterize a module. These simulators may include several models from Spire Corp., NPC, and Yamashita Denso. Most other flash simulators use a single flash technique with a longer pulse. When measuring high-efficiency modules, these simulators can be used in a "multiflash" mode, although usually with a smaller number of pulses because the time between flashes can be several seconds or more for this type of simulator. This invention is also useful for these simulators when used in this multiflash mode.

Constant K1 is chosen so that the voltage, V=K1−K2*terminal current, gives a data point at a particular voltage of interest for the measurement. Next, K2 can be further refined experimentally by varying it in order to minimize the difference between the current-voltage points measured during the rise time and the fall time of the illumination pulse. For example, K2 is varied until a cell current versus intensity graph resembles more the graph of FIG. 9 than that of FIG. 7. This technique works particularly well with the multi-flash type simulators since these have pulse shapes similar to FIG. 1 and FIG. 3 with a symmetrical shape.

For the other discrete flash simulators where the pulse shape may be asymmetrical, K2 is better determined by varying it in order to minimize the difference between the current measured at each intensity for different shapes of light pulses, using data from either the rising or falling sides of the light pulse or both. When the measured current, voltage and intensity is the most independent of the pulse shape in the region of voltage near the maximum power point voltage of the solar cell or module, then the constants are optimized to give the steady-state result.

Figure 2:
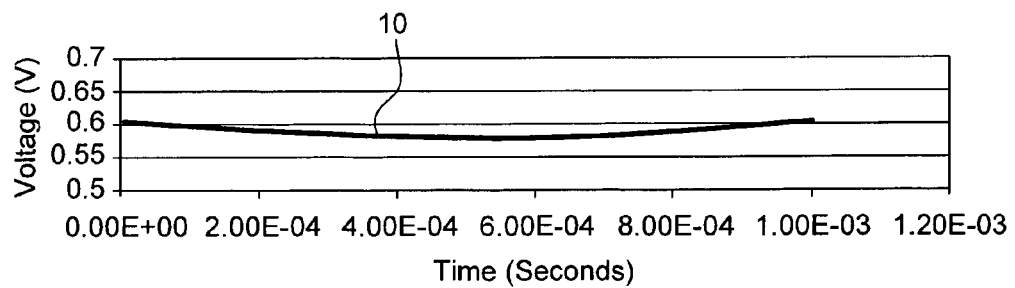
FIG. 2 is a graph of terminal voltage vs. time according to an embodiment of the invention.

FIG. 2 illustrates the terminal voltage vs. time profile that gives a result where the instantaneous current predicts the steady-state current. In this case, voltage 110 is varied as $$\text{Voltage} = 0.605 - 0.6467 * \text{Current Density},$$

where constant K1=0.605, constant K2=0.6467 and where Voltage is in volts, and Current Density is in A/cm².

Figure 3:
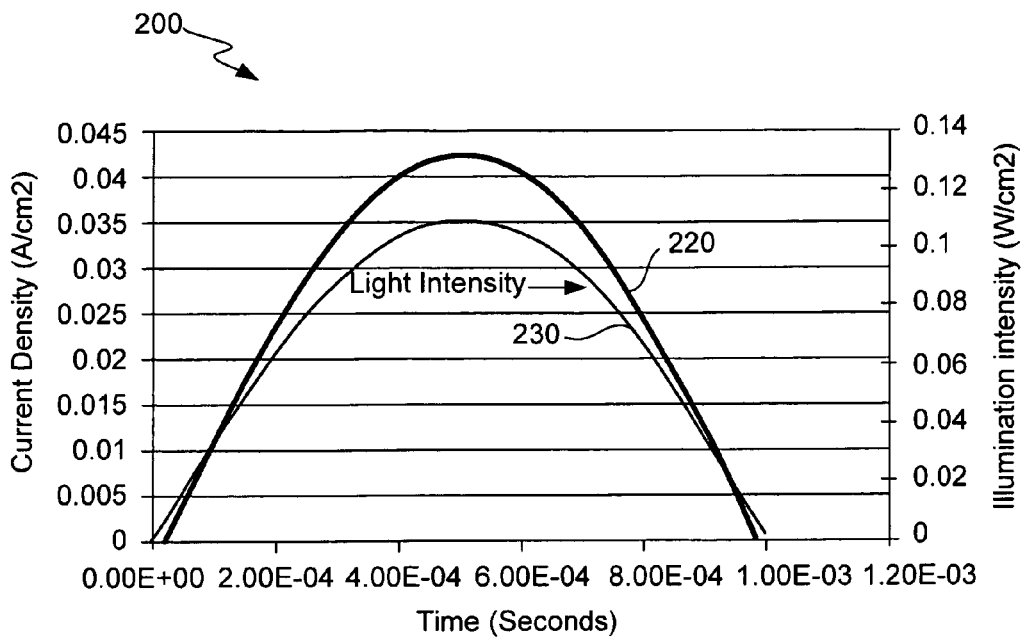
FIG. 3 is a graph of instantaneous and steady-state current vs. time.

FIG. 3 is a graph 200 showing the instantaneous and steady-state current versus time for an embodiment of the present invention. In this example, if voltage 110 is applied to the solar cell under test as shown in FIG. 2 then the instantaneous measured current 220 is the same as the steady-state current. Both currents lie on the same curve, and therefore, short pulses of light can be used to determine the steady-state characteristics of the solar cells or solar modules.

Computer simulations as well indicate that when the current is the same on the rising and falling sides of the pulse for the same intensity, then the data corresponds to the steady-state data that would be obtained at the same constant voltage, current, and intensity. The following two figures illustrate this point.

Figure 4:
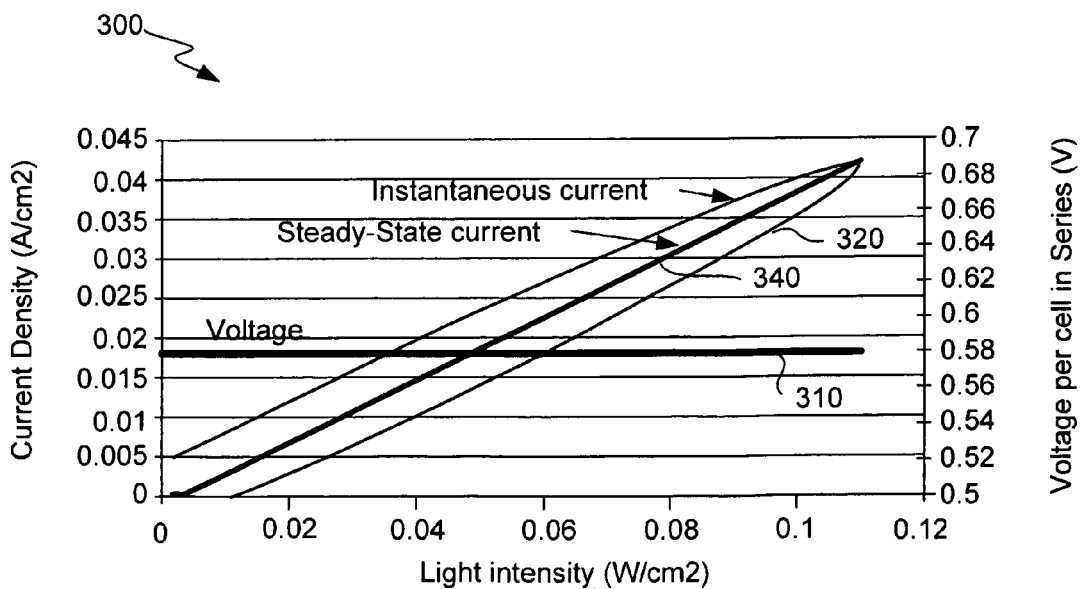
FIG. 4 is a prior art graph of current density vs. light intensity.

FIG. 4 is a graph 300 showing current density versus light intensity for the prior art situation illustrated in FIG. 1. During the light pulse, terminal voltage 310 is held constant. As shown, during the rise time of the light intensity the current 320 measured low, while during the fall time of the light intensity the current measured high (compared to predicted steady-state current 340). The resulting curve for instantaneous current 320 forms a large loop on the graph. One can see that the steady-state current values 340 fall on a straight-line within the loop. Prior art graph 300 clearly shows that the instantaneous measured current is different than the steady-state current for similar light intensity and voltage values.

Figure 5:
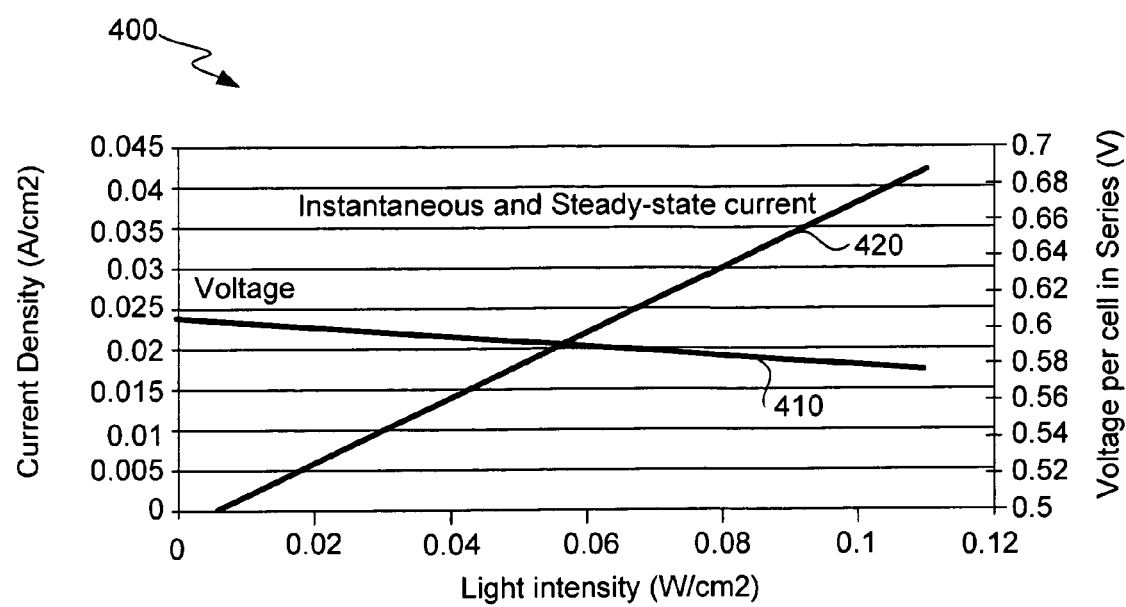
FIG. 5 is a graph of current density vs. light intensity.

FIG. 5 is a graph 400 showing current density versus light intensity according to an embodiment of the present invention. Graph 400 shows a voltage 410 applied to the solar cell or module according to Equation 1 and is to be contrasted with graph 300. In this example, voltage 410 at the terminals of the cell or module is varied with a small signal proportional to the terminal current (V=0.605−0.6467*Current Density). The simulated result is then identical for the rising and falling sides of the illumination pulse and the instantaneous current 420 is also identical to the steady-state current data. Thus, the instantaneous data is predictive of the steady-state data.

Since the current at the maximum power point is nearly proportional to the light intensity, it is further realized that the terminal voltage may also be varied as the measured light intensity to achieve similar results. It is thus possible to construct the voltage vs. time profile using the measured light intensity instead of the measured current according to the equation (Equation 2):

Voltage=Constant Voltage−K2*Light Intensity.

In either case, the current-voltage curve of the solar cell or module may then be assembled using Equations 1 or 2 by taking data for several pulses at different values for the Constant Voltage, K1.

VOLTAGE PROFILE CIRCUIT IMPLEMENTATION

Experimental data confirms these predictions. Analog feedback is used to control the load and apply a voltage profile to the terminals of a commercial silicon solar module consisting of 96 cells in series. In this example, the module used is a commercially-purchased Sanyo HIP-190BA3 module having 96 silicon solar cells connected in series.

The data from the entire pulse was recorded and analyzed to determine the data points (current, voltage and intensity) during the entire light pulse. This data acquisition of the whole pulse is similar to previously used techniques to construct current-voltage curves from photoconductance data from silicon wafers (Sinton 1996) and voltage data from solar cells or solar cell precursors (Sinton 2000).

Figure 6:
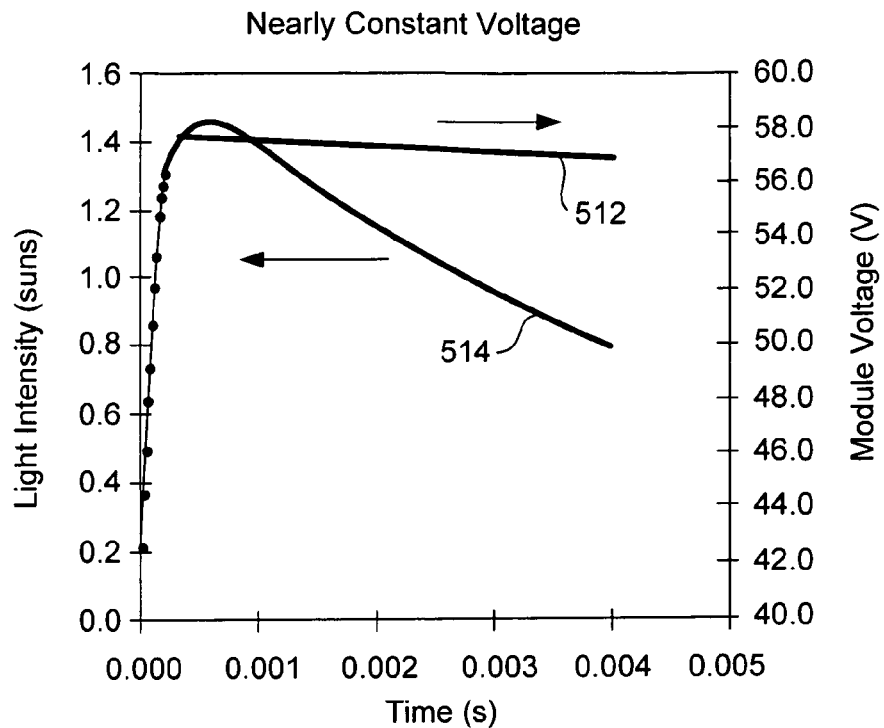
FIG. 6 is a graph of light intensity and module voltage vs. time with a nearly constant voltage.
Figure 7:
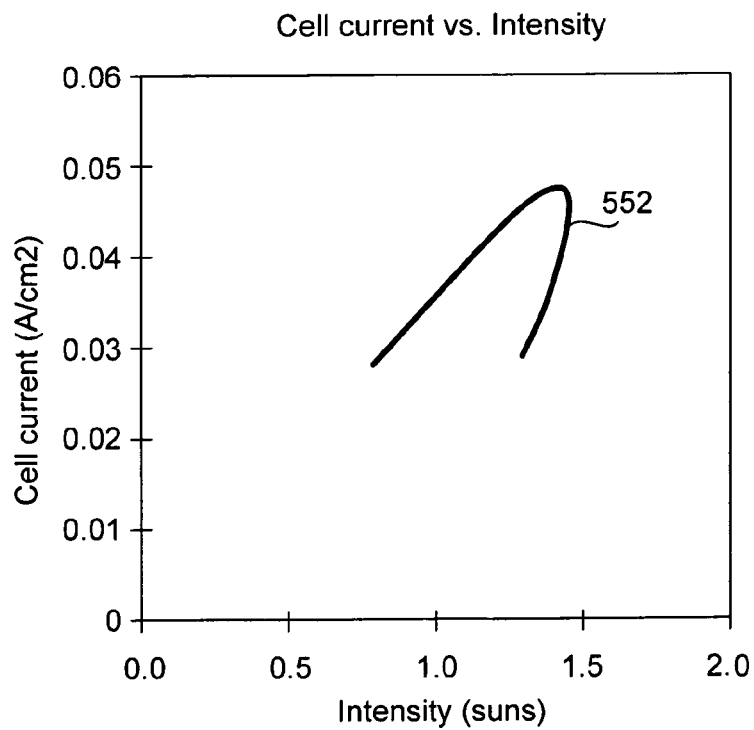
FIG. 7 is a graph of current density vs. light intensity for a nearly constant voltage.

FIG. 6 is a graph showing light intensity and a constant module voltage versus time. In this graph voltage 512 is nearly constant and intensity 514 varies as shown. FIG. 7 is a graph showing cell current versus intensity for the constant voltage applied as in FIG. 6. When a nearly constant voltage 512 is maintained at the module terminals, the current vs. intensity graph of FIG. 7 shows a loop 552 (similar to that shown in the computer-modeled case above). In other words, measurements at nearly constant voltage resulted in a low current on the rising side of the light intensity pulse and a high current on the falling edge of the pulse. By contrast, application of the present invention produces better results.

Figure 8:
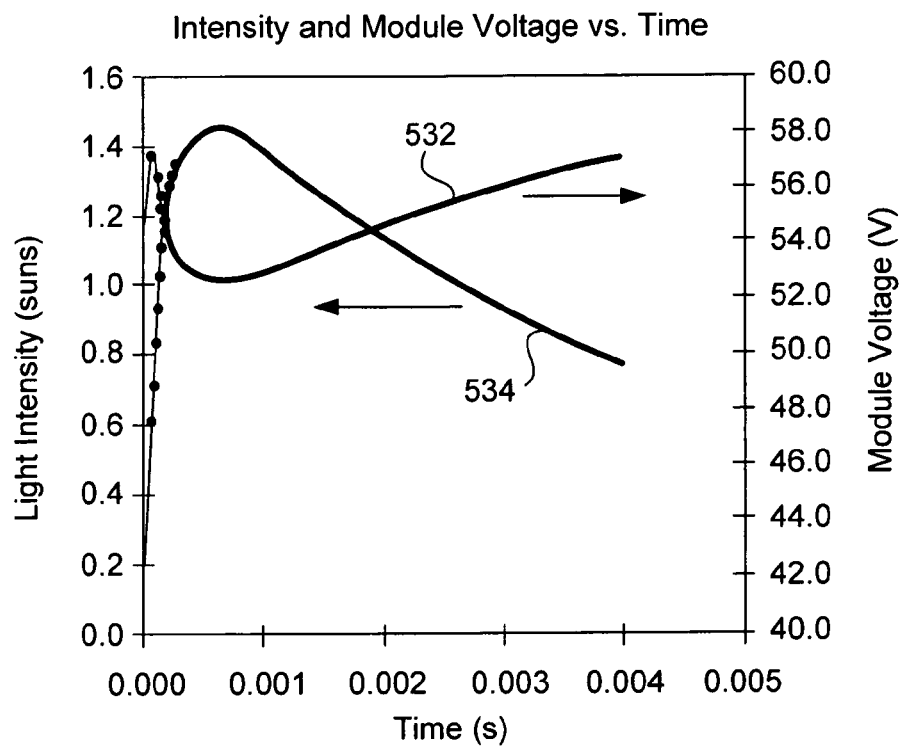
FIG. 8 is a graph of light intensity and varying module voltage vs. time.
Figure 9:
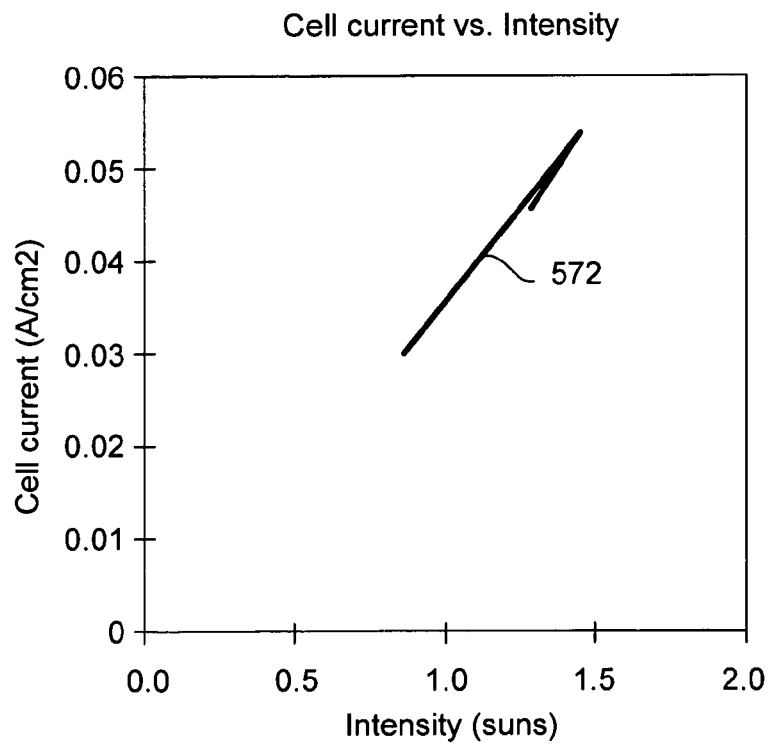
FIG. 9 is a graph of cell current density vs. light intensity for the varying voltage shown in FIG. 8.

FIG. 8 is a graph showing intensity and a varying module voltage versus time. In this graph voltage 532 is proportional to the terminal current and intensity 534 varies as shown. FIG. 9 is a graph showing cell current versus intensity for the varying voltage applied as in FIG. 8. When a voltage 532 is applied according to Equation 1 using an analog feedback circuit, the measured current data 572 of FIG. 9 during the rise time and fall time of the intensity pulse is nearly the same. In other words, when feedback is used to keep the terminal voltage at:

$$V=61.68-1.6445*\text{Current(module)},$$

as shown in FIG. 8, the current data 572 during the rising of the intensity is nearly the same as during the falling of the intensity. This indicates that the appropriate values for K1 and K2 for this module are 61.68 Volts and 1.6445 Ohms, respectively, at the maximum power voltage of 54.8 Volts.

Figure 10:
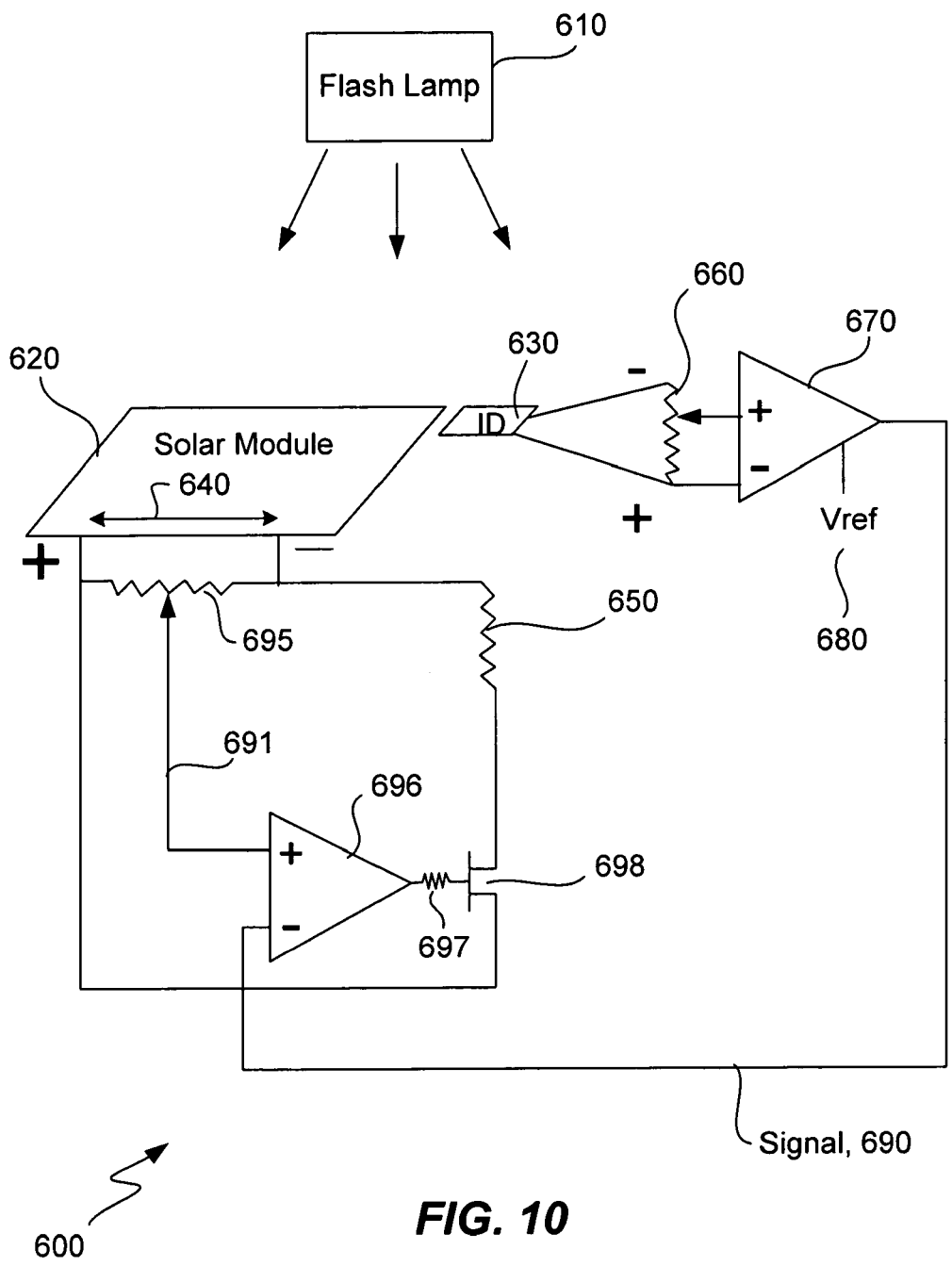
FIG. 10 is a block diagram of an analog feedback system using a light intensity signal.

FIG. 10 illustrates an analog feedback system 600 to control the load on a solar module and thus provide the desired voltage profile. Analog feedback is used to control a HEXFET load transistor in order to impose the terminal voltage as prescribed by Equation 2.

In this particular embodiment, a light pulse from flashlamp 610 is simultaneously incident upon solar module 620 (or upon a solar cell) and an intensity detector 630. The solar module voltage is measured at the terminals of the module 640 while the module current is measured at a 50 m ohm shunt resistor 650. The light intensity detector produces a voltage proportional to the intensity and is measured as the signal across potentiometer 660. This general configuration is common to virtually all pulsed-light solar cell or solar cell module testers.

A signal proportional to intensity is adjusted by 50 k ohm potentiometer 660. An operational amplifier 670 offsets this current signal by a constant voltage, Vref 680. The resulting signal 690 (Vref−K*Light Intensity), is fed into the low input of operational amplifier 696, having a resistor 697 connected to its output. A signal 691 proportional to the module voltage is adjusted through the potentiometer 695, and fed into the high input of the operational amplifier 696. Whenever the module voltage signal 691 exceeds reference signal 690 the HEXFET transistor 698 gate is driven high, and this transistor draws more current from module 620. Since the module voltage will drop when current is drawn, this feedback forces the module voltage (measured across terminals 640) to track proportionally to the voltage at signal 690. This feedback restores the module voltage to the desired value as indicated by Equation 2. As discussed earlier, use of Equation 2 is a very close approximation to Equation 1. The constant K2 is determined in this circuit by the potentiometer 660 as well as the potentiometer 695. The current is measured as the voltage drop across the shunt resistor 650.

In one particular implementation of this embodiment, operational amplifier 670 is component AD620, operational amplifier 696 is component AD620, resistor 697 is 250 ohms, and transistor 698 is component IRFP2907.

Figure 11:
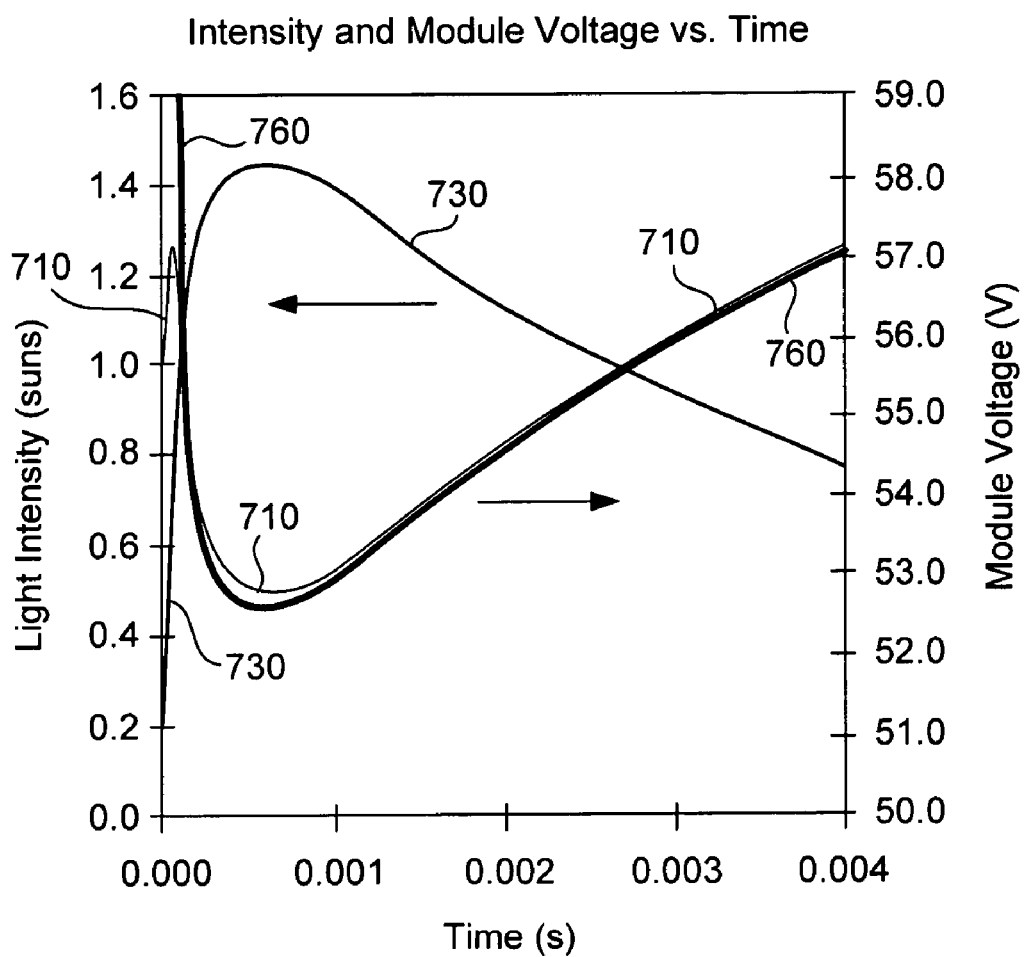
FIG. 11 is a graph of light intensity and voltage as a function of time.

FIG. 11 illustrates the intensity and module voltage versus time resulting from the circuit of FIG. 10. Trace 730 is the light intensity in suns over time. Trace 760 is the desired trace according to Equation 1, V=61.68V−*1.6445*Current (module), and reflects the voltage that would be placed at the terminals of the module or solar cell in the ideal case. Trace 710 is the actual voltage resulting from the circuit shown in FIG. 10, and reflects the measurements shown in FIGS. 6-9 and in FIG. 13. As shown, trace 710 very closely tracks the ideal voltage trace 760 and thus provides a good approximation of the desired result.

A variation on this embodiment is to vary the voltage by the following equation:

Voltage=$K1-K2$*Function (Light Intensity)

where Function is designed to give the expected current for each light intensity based on a typical relationship between current, intensity and voltage for a solar cell or solar module of the type that is being measured. For example, such a function can be (Equation 3)

$I = Isc*(\text{Light intensity}) - C*e^{(q(V+IRs)/nkT))} + (V+IRs)/Rshunt$ where Isc is the terminal short-circuit current at one sun, light intensity is in units of suns, V is the terminal voltage per cell in series, I is the current, C, n, Rs, Rshunt are all fitting parameters fit to experimental data.

For example, using a numerical simulation of the same solar cell as in FIGS. 1-5, the function for the terminal current, Equation 3, predicts the current within 1% accuracy for intensities from 0.8 to 1.2 suns, and voltages between 0 and 0.63V. The fit parameters in this case are:
Isc(A/cm$^2$) C(A/cm$^2$) Rs(Ohm-cm$^2$) Rsh(Ohm-cm$^2$)n
    0.040199 8.84E-13 0.406954 1000000 1.0739

Alternatively, interpolation based on a lookup table of actual data consisting of current-voltage-illumination sets of points from a typical solar cell would be used. In Equation 3 at the maximum power point for a typical solar cell or module, the sum of the $2^{nd}$ and $3^{rd}$ terms is nominally only a 5% correction to the first term. This fact, that the current is very nearly proportional to intensity, indicates why Equation 2 is a good approximation of Equation 1 near the maximum power point of the solar cell or module.

The circuit shown in FIG. 10 bases feedback upon measured light intensity, and is advantageous in that it tends to produce a more stable signal. As an alternative to using feedback based upon a real-time measurement of the light intensity, measurement of the current may be used instead to implement the desired voltage. Using the current signal, however, can lead to unstable feedback in that the current signal is more susceptible to circuit oscillation. From a strictly theoretical standpoint, though, analysis of the underlying physics indicates that feedback based upon the current signal (in accordance with Equation 1) is best.

Figure 12:
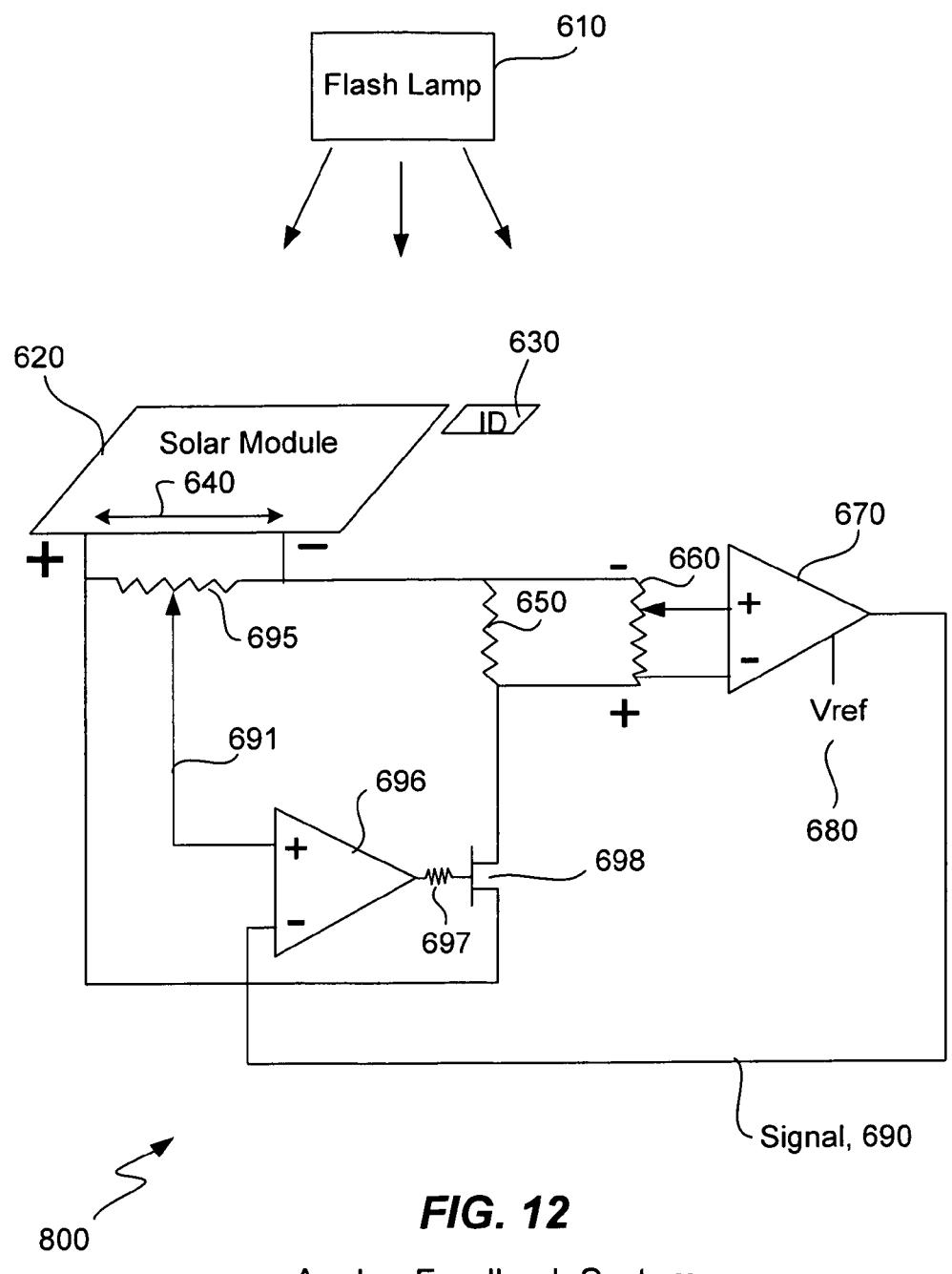
FIG. 12 is a block diagram of an analog feedback system using a terminal current signal.

A similar circuit to the circuit 600 shown in FIG. 10 can implement Equation 1 by using the signal from the current sensor in place of the light intensity sensor 630. FIG. 12 illustrates an analog feedback system 800 to provide the desired voltage profile that uses a signal from the current sensor. Instead of potentiometer 660 receiving input from intensity detector 630, input is received from across shunt resistor 650. Thus, potentiometer 660 can be used to choose a fraction of the current signal. This current signal is added to a reference voltage 680, giving a signal 690, Vref−

K*Current; this signal is in the form of Equation 1. Signal 690 is fed into the low input of operational amplifier 696 and the system operates as described above.

Another alternative is to digitally synthesize the desired voltage time profile and apply this signal to the terminals of the solar cell or solar module in synchronization with the light pulse. This method is likely to be very stable and unlikely to oscillate because there would be no electrical feedback loop in the circuit.

Figure 13:
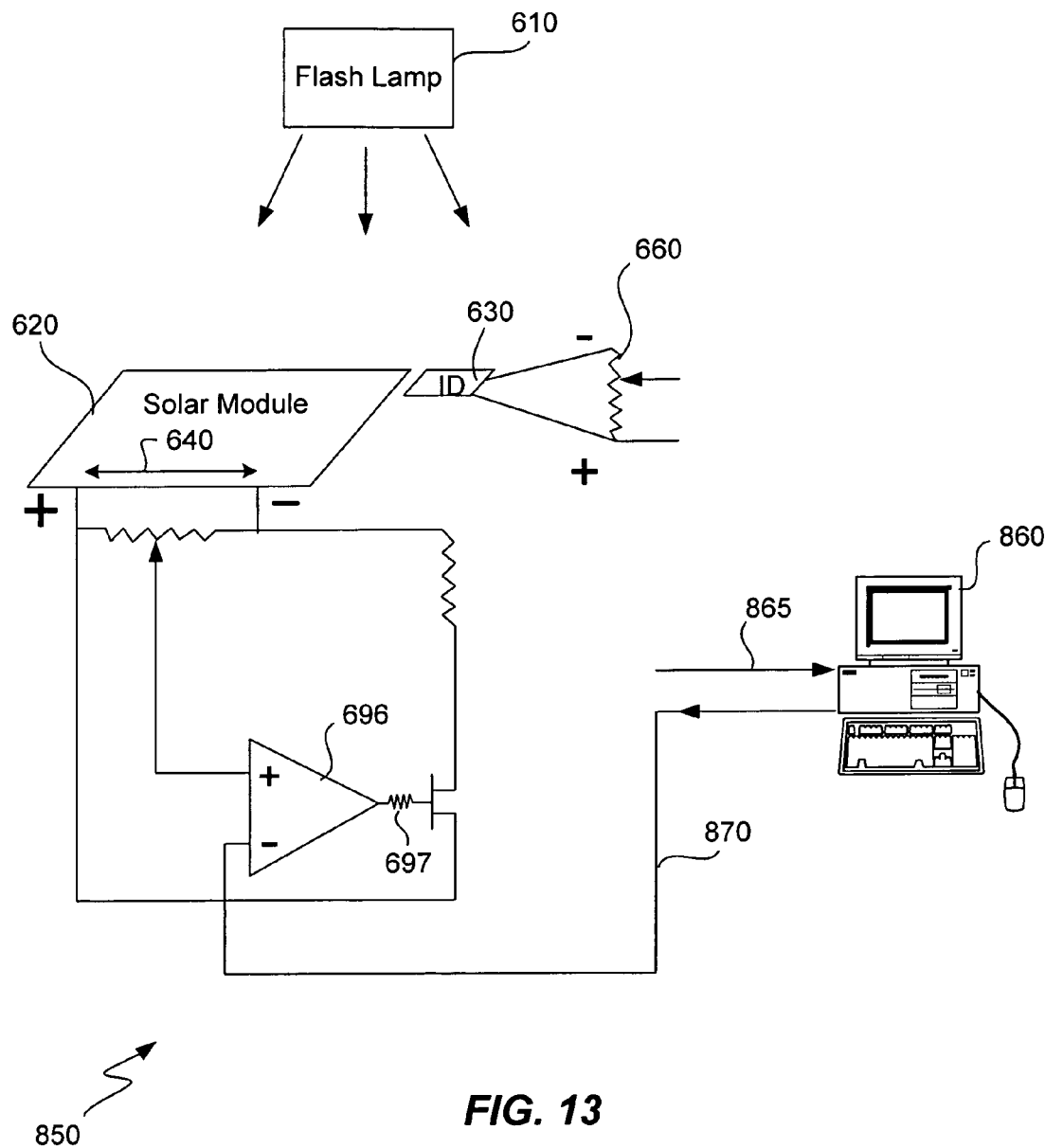
FIG. 13 is a block diagram of an implementation using a digital waveform to control the terminal voltage.

FIG. 13 illustrates a digital system 850 to provide the desired voltage profile using digital synthesis. System 850 is similar to the system of FIG. 10 except that signal 870 is provided by computer 860 instead of originating from operational amplifier 670. Computer 860 includes an input interface 865 for accepting as input the terminal voltage 640, the terminal current and the light intensity via potentiometer 660. Computer 860 also includes suitable hardware for analog-to-digital conversion such as an analog-to-digital data acquisition card, and hardware for digital-to-analog conversion such as a waveform generator.

In operation, light source 610 emits a series of light pulses that are incident upon solar module 620 and intensity detector 630. For each light pulse, the computer records the terminal voltage, the terminal current and the light intensity signals during the entire light pulse using an analog-to-digital data acquisition card. After the data from a pulse N is recorded, the computer calculates the ideal voltage vs. time trace based on Equation 1 so that V(t)=$K1-K2$*I(t) using the data from pulse N.

This equation is then converted into a pulse, V(t), in a data acquisition card waveform generator (a digital-to-analog conversion). This waveform 870 is then applied to the low input of operational amplifier 696 in synchronization with light pulse N+1, thus forcing the solar module voltage to be proportional to this waveform as in the analog feedback case. If there is good reproducibility of the light waveform from pulse to pulse, then instead of using pulse N to calculate the waveform for pulse N+1, data from any typical pulse may be used. Also, if the voltage waveform of the N+1 pulse is measured at pulse N+1 and found to differ from the ideal V(t) due to imperfect circuit response, then the computer can calculate the difference between the actual V(t) and the ideal V(t) and compensate in the signal output 870, so that the measured V(t) for each pulse best corresponds to the ideal V(t) according to Equation 1.

The constant K2 may be determined once for any given cell technology, and then used to measure all modules or cells of that type. The accuracy of each measurement can be reported based on the width in current of the loop at a given intensity and voltage of interest as in FIG. 4. For example, if this width in current between the two branches of the loop was greater than ±2% of the current at the intensity of interest (1 sun), then K2 can be adjusted until the loop closed down back into a line indicating that it is reporting the steady-state result for current.

The technique of using analog feedback works best with the single-flash simulators, while the digital synthesis technique may work better with the multi-flash type simulators.

CURRENT-VOLTAGE CURVE AND CELL EFFICIENCY

Figure 14:
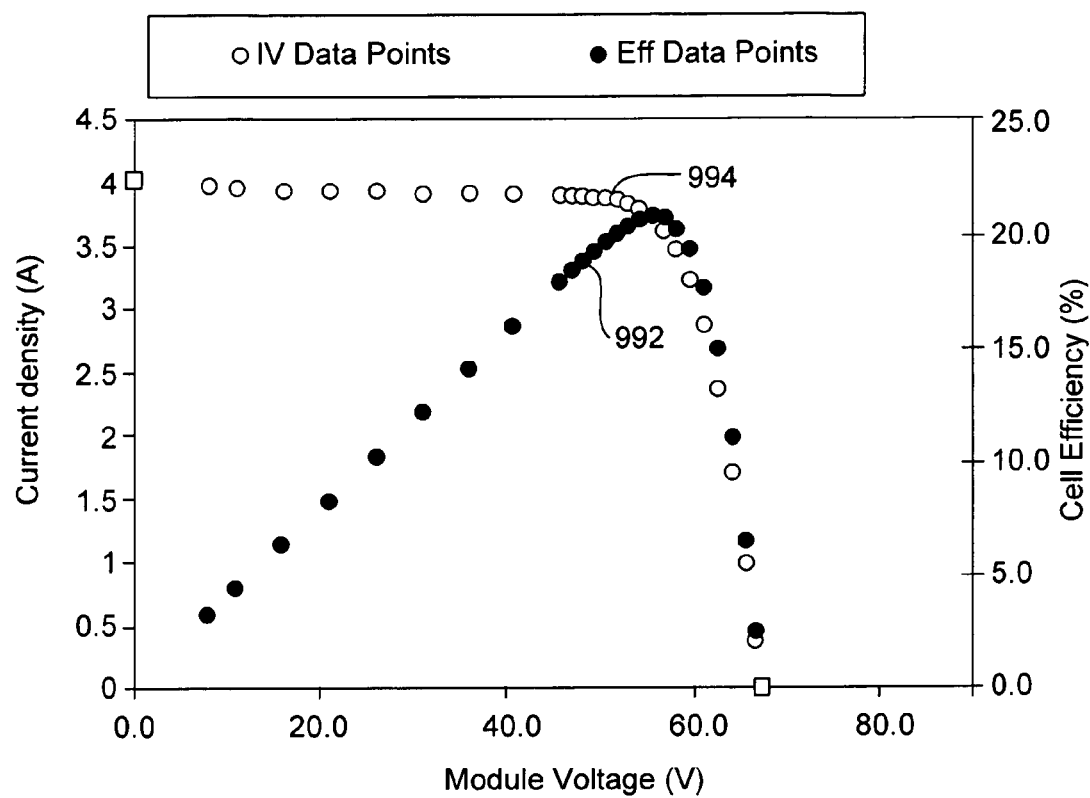
FIG. 14 is a graph of current and efficiency vs. cell voltage.

Whether the circuit is implemented as shown in FIG. 10, FIG. 12, in a similar analog feedback system or by using digital synthesis, a current-voltage curve may be plotted and cell efficiency calculated. FIG. 14 shows a current-voltage curve 992 and cell efficiency curve 994 for a particular solar cell at one sun of illumination intensity. By varying the reference voltage for successive pulses, different voltage points of the current-voltage curve are obtained for each light pulse until an adequate curve of data points is achieved. As shown, current density is constant, and cell efficiency increases, up to about 55 volts at which point the current and cell efficiency drop off dramatically The maximum power point, 54.8V for this module, is of particular interest because the power output rating of the module will be based on this measured data point.

In general, the shorter the pulse of light required to obtain accurate measurements, the quicker the measurement. For flashlamp pulses or LED light pulses, the cost of the illumination source is often dependent upon the average power required because smaller power supplies can be used for shorter pulses. For short pulses and low duty cycles, little or no active cooling is required in the power supplies or circuitry. Thus, the present invention allows the accurate prediction of the steady state performance of high-efficiency solar cells based upon measurements using short light pulses, allowing quick, accurate, and inexpensive measurements of solar cells or solar modules. Many existing flashlamp module testers within industry can be retrofitted using the novel techniques described herein in order to measure the new generations of high-efficiency solar modules accurately.

ALTERNATIVE EQUATIONS FOR VOLTAGE

Although the form of Equation 1 is anticipated to be an adequate correction for most high-efficiency solar cells, it is anticipated that an equation having higher order terms may improve the correction for some cases, for example of the form:

$$V(t)=K1-K2^*\text{current}+/-K3^*(\text{current})^2+/-\ldots$$

There are numerous cases where higher order terms may be useful, for example, cases where the K2*current term is larger than about 26 mV per cell in series (about 5% of the maximum power voltage for most cells). In this case, different parts of the solar cell may be running at significantly different voltages, introducing non-linear effects into the distribution of charge within the solar cell. Cases where the solar cell design is highly 2- or 3-dimensional also create non-linear effects in the charge distribution within the solar cell. This can result in significant charge storage even at short-circuit conditions at the solar cell or module terminals. In cases where the photogeneration in the solar cell is far from the collection junction the resulting charge storage in the solar cell even at short-circuit conditions is comparable to the charge storage at the maximum power voltage.

Even when these effects are present, the K2*current term is the main effect and is likely to be an adequate correction term for the purposes of making accurate measurements of the solar cells or modules. The cases listed above tend to decrease the efficiency of high-efficiency cells, and therefore these cases are minimized in high-efficiency solar cells. Although non-linear terms may be present for perfectly correct terms for measurements under pulsed light, most solar cells will be measured suitably using the form of Equation 1.

The following references referred to herein are all hereby incorporated by reference:

[1] Kees van der Pool et al., U.S. Pat. No. 4,129,823.
[2] P. G. Borden et al., Proc. IEEE Photovoltaics Conference, 1981, pp. 193-196.
[3] J. J. Wiczer et al., Proc. IEEE Photovoltaics Conference, 1981, pp. 448-453.
[4] D. L. King, J. M. Gee, and B. R. Hanson, Proc. 20th IEEE Photovoltaics Conference, 1988, pp. 555-559.
[5] R. A. Sinton et al., Appl. Phys. Lett. 69 (17), 21 Oct. 1996.
[6] H. A. Ossenbrink et al., Proc. IEEE Photovoltaics Conference, 1993, pp. 1194-1196.
[7] Jaakko Hyvärinen, U.S. Pat. No. 5,945,839.
[8] R. A. Sinton and A. Cuevas, Proc. $16^{th}$ EPSEC, 2000, pp. 1152-1155.
[9] William M. Keogh, Andrew W. Blakers and Andres Cuevas, Solar Energy Materials and Solar Cells 81, 2004, pp. 183-186.
[10] D. A. Clugston and P. Basore, Proc. $26^{th}$ IEEE, September 1997.
[11] R. A. Sinton et al., Proc. 19th EPSEC, 2005.
[12] R. A. Sinton et al., IEEE Trans. Elec. Dev. Vol. 34, No. 10, pp. 2116-2123, October 1987
[13] R. A. Sinton, IEEE Trans. Elec. Dev. Vol. ED-34, No. 6, pp. 1380-1389, June 1987.

COMPUTER SYSTEM EMBODIMENT

Figure 15A:
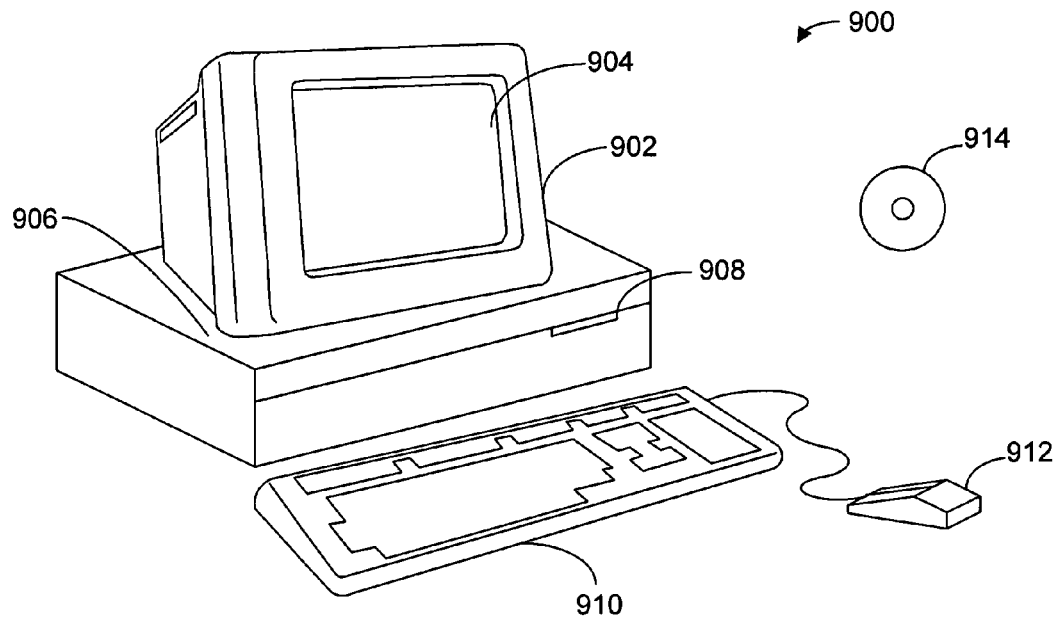
FIGS. 15A and 15B illustrate a computer system 900 suitable for implementing embodiments of the present invention.
Figure 15B:
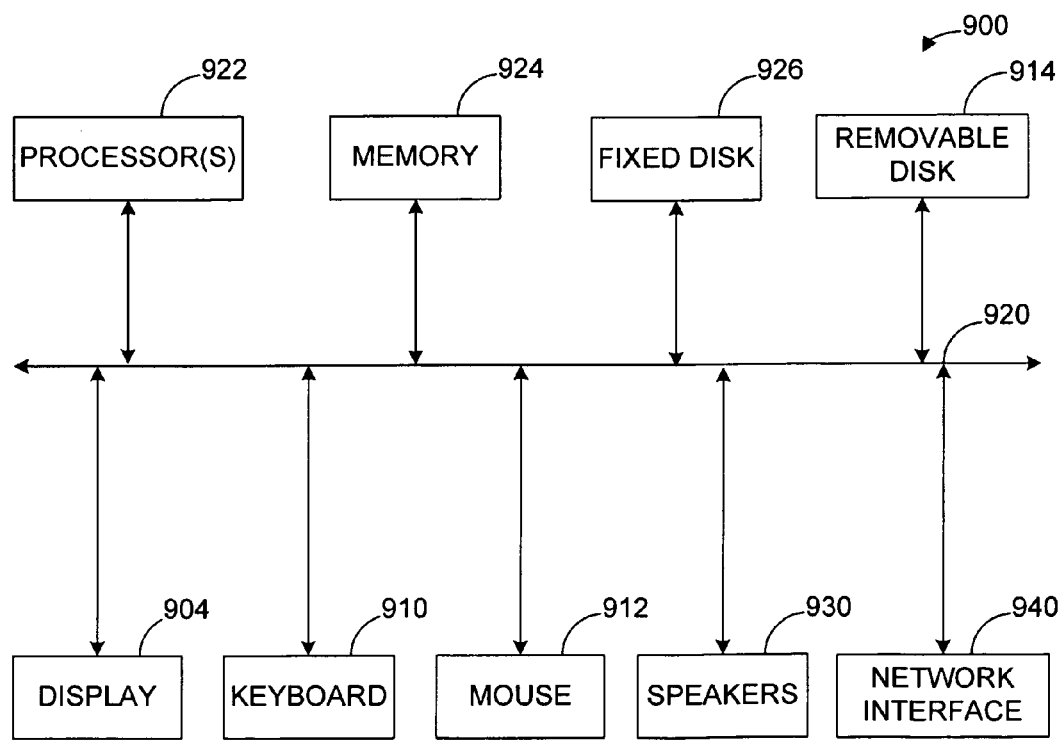

FIGS. 15A and 15B illustrate a computer system 900 suitable for implementing embodiments of the present invention. FIG. 15A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 15B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and a multi-function data acquisition card capable of high-speed analog-to-digital conversion as well as high-speed digital-to-analog conversion 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method for measuring characteristics of a solar cell or solar module, said method comprising:

applying a light pulse to said solar cell or solar module such that a terminal current is produced at the terminals of the solar cell or solar module;

varying a terminal voltage at the terminals of said solar cell or solar module during said light pulse wherein said terminal voltage varies substantially by the equation terminal voltage=$K1-K2*$(terminal current), wherein said values K1 and K2 are positive constants and K2 is nonzero; and measuring said terminal current and said terminal voltage at instantaneous intensities during said light pulse, wherein said values K1 and K2 are chosen such that said measured terminal current and terminal voltage at each illumination intensity during said light pulse are substantially similar to steady state current and voltage data at each illumination intensity.

2. A method as recited in claim 1 wherein the value $K2*$(terminal current) is in a range of about 5% to about 15% of the value K1 when the value $K1-K2*$(terminal current) is the maximum power voltage of the solar cell or module.

3. A method as recited in claim 2 wherein the value $K2*$(terminal current) is about 10% of the value K1 when the value $K1-K2*$(terminal current) is the maximum power voltage of the solar cell or module.

4. A method as recited in claim 1 wherein said light is from a flashlamp, LED source, or other pulsed light source.

5. A method as recited in claim 4 wherein said light is from a Xenon flashlamp.

6. A method as recited in claim 1 wherein said terminal voltage is produced using feedback from said solar cell or solar module and analog circuitry.

7. A method as recited in claim 1 wherein said terminal voltage is produced using digital synthesis.

8. A method as recited in claim 1 further comprising:

applying successive light pulses to said solar cell or solar module; and stepping the value K1 from 0 volts up to the open-circuit voltage of said solar cell or solar module.

9. A method as recited in claim 1 wherein said equation includes at least one higher order term terms.

10. A method as recited in claim 1 wherein said solar cell or solar module is a high-efficiency solar cell or solar module having an efficiency of greater than about 17%.

11. A method as recited in claim 1 further comprising:

varying said terminal voltage to maintain a constant stored charge in said solar cell or solarmodule.

12. A method for measuring characteristics of a solar cell or solar module, said method comprising:

applying a light pulse to said solar cell or solar module;

receiving said light pulse at an intensity detector and producing a signal corresponding to light intensity;

varying a terminal voltage at the terminals of said solar cell or solar module during said light pulse wherein said terminal voltage varies substantially by the equation terminal voltage=$K1-K2*$(light intensity signal), wherein said values K1 and K2 are positive constants and K2 is nonzero; and measuring said terminal current and said terminal voltage at instantaneous intensities during said light pulse, wherein said values K1 and K2 are chosen such that said measured terminal current and terminal voltage at each illumination intensity during said light pulse are substantially similar to steady state current and voltage data at each illumination intensity.

13. A method as recited in claim 12 wherein the value $K2*$(light intensity signal) is in a range of about 5% to about 15% of the value K1 when the value $K1-K2*$(light intensity signal) is the maximum power voltage of the solar cell or module.

14. A method as recited in claim 13 wherein the value $K2*$(light intensity signal) is about 10% of the value K1 when the value $K1-K2*$(light intensity signal) is the maximum power voltage of the solar cell or module.

15. A method as recited in cliam 12 wherein said light pulse is from a flashlamp, LED source, or other pulsed light source.

16. A method as recited in claim 15 wherein said light pulse is from a Xenon flashlamp.

17. A method as recited in claim 12 wherein said terminal voltage is produced using output from said intensity detector and analog circuitry.

18. A method as recited in claim 12 wherein said terminal voltage is produced using digital synthesis.

19. A method as recited in claim 12 wherein said terminal voltage varies as terminal voltage=$K1-K2*$function (light intensity signal), wherein said function is designed to give an expected terminal current for each light intensity for said solar cell or solar module.

20. A method as recited in claim 12 further comprising:
applying successive light pulses to said solar cell or solar module; and
stepping the value K1 from 0 volts up to the open-circuit voltage of said solar cell or solar module.

21. A method as recited in claim 12 wherein said equation includes at least one higher order term.

22. A method as recited in claim 12 wherein said solar cell or solar module is a high-efficiency solar cell or solar module having an efficiency of greater than about 17%.

23. A method as recited in claim 12 further comprising:
varying said terminal voltage to maintain a constant stored charge in said solar cell or solarmodule.

24. An apparatus for measurement of current and voltage of a solar cell or solar module at instantaneous intensities, said apparatus comprising:
a light source that generates a light pulse;
an intensity detector that receives said light pulse and produces a light intensity signal; and
circuitry means for varying a terminal voltage of said solar cell or solar module during said light pulse according substantially to the equation terminal voltage=$K1-K2*$(light intensity signal), wherein said values K1 and K2 are positive constants and K2 is nonzero, wherein said values K1 and K2 are chosen such that said measured terminal current and terminal voltage at each illumination intensity during said light pulse are substantially similar to steady state current and voltage data at each illumination intensity.

25. An apparatus as recited in claim 24 wherein the value K2*(light intensity signal) is in a range of about 5% to about 15% of the value K1 when the value K1−K2*(light intensity signal) is the maximum power voltage of the solar cell or module.

26. An apparatus as recited in claim 25 wherein the value K2*(light intensity signal) is about 10% of the value K1 when the value K1−K2*(light intensity signal) is the maximum power voltage of the solar cell or module.

27. An apparatus as recited in claim 24 wherein said light source is a flashlamp, an LED source, or another pulsed light source.

28. An apparatus as recited in claim 27 wherein said light source is a Xenon flashlamp.

29. An apparatus as recited in claim 24 wherein said analog circuitry means varies said terminal voltage substantially as terminal voltage=$K1-K2*$function (light intensity signal), wherein said function is designed to give an expected terminal current for each light intensity for said solar cell or solar module.

30. An apparatus as recited in claim 24 wherein said light source generates successive light pulses, said apparatus further comprising:
means for stepping the value K1 from 0 volts up to the open-circuit voltage of the said solar cell or solar module.

31. An apparatus as recited in claim 24 wherein said circuitry means is analog circuitry means.

32. An apparatus as recited in claim 24 wherein said circuitry means is implemented using digital synthesis.

33. An apparatus as recited in claim 24 wherein said equation includes at least one higher order term terms.

34. An apparatus as recited in claim 24 wherein said solar cell or solar module is a high-efficiency solar cell or solar module having an efficiency of greater than about 17%.

35. A method as recited in claim 24 further comprising:
varying said terminal voltage to maintain a constant stored charge in said solar cell or solarmodule.

36. An apparatus for measurement of current and voltage of a solar cell or solar module at instantaneous intensities, said apparatus comprising:
a light source that generates a light pulse;
said solar cell or solar module having a terminal current in response to said light pulse; and
circuitry means for varying a terminal voltage of said solar cell or solar module during said light pulse according substantially to the equation terminal voltage=$K1-K2*$(terminal current), wherein said values K1 and K2 are positive constants and K2 is nonzero, wherein said values K1 and K2 are chosen such that said measured terminal current and terminal voltage at each illumination intensity during said light pulse are substantially similar to steady state current and voltage data at each illumination intensity.

37. An apparatus as recited in claim 36 wherein the value K2*(terminal current) is in a range of about 5% to about 15% of the value K1 when the value K1−K2*(terminal current) is the maximum power voltage of the solar cell or module.

38. An apparatus as recited in claim 37 wherein the value K2*(terminal current) is about 10% of the value K1 when the value K1−K2*(terminal current) is the maximum power voltage of the solar cell or module.

39. An apparatus as recited in claim 36 wherein said light source is a flashlamp, an LED source, or another pulsed light source.

40. An apparatus as recited in claim 39 wherein said light source is a Xenon flashlamp.

41. An apparatus as recited in claim 36 wherein said light source generates successive light pulses, said apparatus further comprising:
means for stepping the value K1 from 0 volts up to the open-circuit voltage of the said solar cell or solar module.

42. An apparatus as recited in claim 36 wherein said circuitry means is analog circuitry means.

43. An apparatus as recited in claim 36 wherein said circuitry means is implemented using digital synthesis.

44. An apparatus as recited in claim 36 wherein said equation includes at least one higher order term.

45. An apparatus as recited in claim 36 wherein said solar cell or solar module is a high-efficiency solar cell or solar module having an efficiency of greater than about 17%.

46. A method as recited in claim 36 further comprising:
varying said terminal voltage to maintain a constant stored charge in said solar cell or solar module.

* * * * *